United States Patent

Rygiol

[15] 3,697,847
[45] Oct. 10, 1972

[54] SERVOMOTOR CONTROL

[72] Inventor: Henry V. Rygiol, 3146 Purer Road, Escondido, Calif. 92025

[22] Filed: Jan. 27, 1971

[21] Appl. No.: 110,020

[52] U.S. Cl. ............................... 318/608, 318/685
[51] Int. Cl. ............................................. G05b 1/01
[58] Field of Search ....... 318/603, 608, 601, 685, 606

[56] References Cited

UNITED STATES PATENTS

| | | | |
|---|---|---|---|
| 3,427,442 | 2/1969 | Sklaroff | 318/601 X |
| 3,497,778 | 2/1970 | Gerber | 318/685 X |
| 3,146,386 | 8/1964 | Gerber | 318/685 X |
| 3,462,663 | 8/1969 | Schiller | 318/606 |
| 3,486,090 | 12/1969 | Auvil | 318/606 |

*Primary Examiner*—Benjamin Dobeck
*Attorney*—Edward D. O'Brian

[57] ABSTRACT

A control system in which an electric motor is operated in either of two directions in order to accomplish a function may be constructed so as to utilize a reference means which supplies a current having pulses at an initial frequency. A splitter means is used to split the reference current into separate currents, each having pulses with related frequencies. The first of these separate currents is supplied to a shifter means together with a control current having pulses at a control frequency which corresponds to a function to be accomplished by the operation of the motor. This shifter means produces an output having pulses at a variable frequency corresponding to when pulses of the first of the separate currents are in synchronism with pulses of the control current. The frequency pulses of the shifter means are compared in the comparison means with the frequency of pulses from within said second separate current to determine if the frequency of one is greater than the other. The motor is connected to the comparison means so as to be operated in either of the noted directions, depending upon which of the frequencies compared is greater.

6 Claims, 4 Drawing Figures

PATENTED OCT 10 1972 3,697,847

INVENTOR
HENRY V. RYGIOL
BY
EDWARD D. O'BRIAN
ATTORNEY

SERVOMOTOR CONTROL

BACKGROUND OF THE INVENTION

It is common to control the operation of an electric motor through the use of a control system. A large number of different types of such control systems are commonly known and utilized. The terms "servomechanism" or "servomotor control system" are commonly used to designate motor control systems in which a portion of the output of the motor or a result or function of the output of the motor is recycled or fed back into the control system in order to govern the operation of the motor itself.

Servomechanisms having the operational and/or functional characteristics indicated are commonly and widely utilized to perform an almost limitless number of functions. They are commonly used to control voltages, speeds, temperatures, automatic pilot mechanisms, recorders, heating elements, welding torch positions, welding arc voltages, web alignments and many, many more things. In accomplishing any such control function simplicity, effectiveness and reliability are all extremely important.

The most common electric servomechanisms have been constructed so as to utilize a Wheatstone bridge type network containing a reference potentiometer and a balancing or nulling potentiometer. In this type of structure, power is supplied to the bridge and any out of balance condition between the two potentiometers in the network is used so as to cause the operation of a motor, the output of which either directly or indirectly results in the adjustment of the balancing potentiometer.

Wheatstone bridge type servomechanisms as indicated in the preceding discussion are unquestionably utilitarian. Depending upon how they are constructed such servomechanisms have various disadvantages. Frequently, such mechanisms as constructed tend to continuously "hunt" or overshoot a stable condition. In other words, it is frequently difficult to obtain direct adjustment to a stable condition with such prior mechanisms. Frequently it is necessary to employ undesirable secondary or auxiliary means such as breaks, gear reducers and so forth with such mechanisms.

It will be recognized that this is not a complete discussion of the various disadvantages and limitations of bridge-type electric servo systems or mechanisms. A complete discussion of this subject matter would be extremely voluminous and is unnecessary for an understanding of this invention. An understanding of the reasons for the invention merely requires an understanding that prior electric servomechanisms have frequently been unsatisfactory or undesirable for any of a variety of reasons.

SUMMARY OF THE INVENTION

An objective of the present invention is to provide new and improved control systems for use in controlling the operation of electric motors. A further object of this invention is to provide control systems for this purpose which are servo control systems or servomechanisms. Further objectives of this invention are to provide control systems as described which overcome various disadvantages and limitations of prior related systems, which are more desirable in many respects than prior related systems, which may be constructed at comparatively nominal costs, which may be easily and conveniently employed, which function satisfactorily and which are capable of giving prolonged, reliable performance.

In accordance with this invention, these and various related objectives of the invention are achieved by providing in a control system in which an electric motor is operated in either of two directions or manners to accomplish a function, the improvement which comprises: a means for supplying two different pulse trains at related reference frequencies, a control means for supplying pulses at a control frequency corresponding to a function to be accomplished by the operation of the motor, a shifter means for producing an output current having pulses at a variable frequency corresponding to when pulses of one of said pulse trains are in synchronism with the pulses at the control frequency, and comparison means for comparing the frequency of the pulses at the variable frequency with the frequency of pulses within the other of said pulse trains to determine which of the two is the greatest. The comparison means is connected to the motor so as to govern the operation of the motor in accordance with which of these two frequencies is the greatest.

BRIEF DESCRIPTION OF THE DRAWING

The invention is best more fully explained with reference to the accompanying drawing in which.

Figure 1:
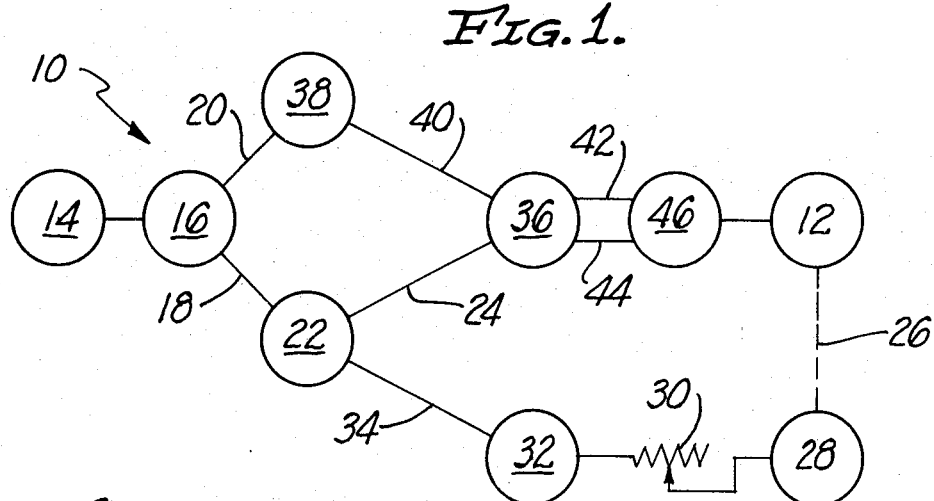
FIG. 1 is a schematic, block-diagram of a presently preferred embodiment or form of a servomotor control system in accordance with this invention.

The accompanying drawing is primarily intended to be used for explanatory purposes in explaining a presently preferred embodiment or form of the invention; it is not to be taken as limiting the invention in any respect. Various changes may be made in the structure indicated by the drawing through the use or exercise of routine engineering skill without departing from the essential features or principles of this invention as defined by the appended claims.

BRIEF DESCRIPTION OF THE PREFERRED EMBODIMENT

In the drawing there is indicated a servomotor control system 10 of the present invention used to control the operation of an electric motor 12. Preferably this motor 12 is of a type commonly referred to as a synchronous inductor motor. Motors of this type are well-known and are described in an article entitled "Characteristics of a Synchronous Inductor Motor" by Snowdon et al appearing in the March 1962 issue of "Applications and Industry" published by the American Institute of Electrical Engineers. Those skilled in the art will realize that such motors may be referred to as digital or stepping motors.

Such motors demonstrate at least full performance torque at 3,000 speed. The power available from such motors is practically independent of motor speed. Such motors only execute motion steps–i.e., only operate to cause motion upon the application of an electric signal in a positive digital form. They are of course reversable and will perform satisfactorily in either direction. These and various related characteristics of these motors make them quite advantageous for use in a system such as the system 10 in accordance with this invention.

This system 10 includes a reference means 14 which is used to supply a reference current having pulses at what may be termed an initial frequency. In the presently preferred embodiment of this invention the frequency of these pulses is 16,000 cps. The reference means 14 may be any type of conventional or known structure for putting out pulses at a constant frequency or rate.

In the system 10 such pulses are supplied to a known phase splitter or splitter means 16. In the presently preferred construction in accordance with the invention the phase splitter 16 is an integrated circuit designated by the number SN 7474 manufactured by Texas Instruments, Inc., Dallas, Texas 75222. In the splitter 16 this integrated circuit is operated so as to split the applied current into two different, first and second outputs which are supplied to lines 18 and 20, respectively. These outputs consist of pulses at half the frequency of the input from the reference means 14.

The frequencies of the pulses supplied to the lines 18 and 20 by the phase splitter 16 may be regarded or considered as "timing," "clock" or "reference" frequencies and the pulses represented by these frequencies may be regarded as "clock" or "timing" pulses inasmuch as the two outputs from the phase splitter 16 are used to achieve a timing function. In theory it is possible to obtain two different signals of timing pulses at related frequencies in other manners than specifically described herein. However, when separate sources are used for currents having pulses at related frequencies there is always a danger that due to some external factors that the frequencies of the pulses may not be related in exactly the desired manner.

In the structure shown the output supplied to the line 18 is applied to what is termed herein as a pulse shifter or shifter means 22. In the preferred embodiment of the specification this shifter 22 takes the form of the integrated circuit SN 7474 designated in the preceding. It is used to produce an output current having pulses at a variable frequency in a line 24. Such an output is provided in accordance with the feedback from the operation of the motor 12.

This feedback is indicated by a dotted line 26 in the drawing. It is to be understood that this is an extreme over simplification. This line 26 is used herein to designate structures such as are common and conventional in connection with known electric servomechanisms in order to provide a feedback signal. The structures represented by the line 26 will vary significantly depending upon the specific application of the system 10. Normally such a structure will be mechanical, but it can and frequently will be a structure which provides an electric signal directly.

With the particular structure of the system 10 illustrated, the feedback represented by the line 26 is used to create a voltage at a conventional voltage transducer 28 such as is conventionally used in related electrical servomechanisms. In the particular system 10 shown such a voltage is supplied to a small variable resistor 30 used to modify the feedback voltage. The output of the resistor 30 is fed to a frequency converter 32. This converter 32 can be constructed so that the resistor 30 is not needed.

The purpose of the frequency converter 32 is to convert the analog feedback voltage supplied to it to a series of pulses. In the preferred embodiment of the invention described such a series will be at a frequency within the range of from 0 to 800 cps. Such conversion of an analog quantity to a digital quantity can be achieved in a number of different manners with a number of different types of known or conventional circuit components. As an example of this a conventional voltage controlled multivibrator may be utilized as the analog to frequency converter 32. It will be realized that the frequency or repetition rate of the pulses produced by the converter 32 and supplied to a line 34 serving as an output of this converter 32 will correspond to the operation of or a function performed by the motor 12. Because the "net product" of the line 26, the transducer 28, the resistor 30 and the converter 32 is a series of pulses used as hereinafter described to control the operation of the motor 12 this assembly of parts in the system 10 may be referred to as a feedback or a control means for supplying control pulses at a control frequency or rate in accordance with the operation of the motor 12. In the system 10 such pulses are supplied to the pulse shifter 22 so as to complete the feedback loop in the system 10.

The operation of this pulse shifter 22 so as to produce an output to the line 24 as previously indicated is quite important to the overall operation of the system 10. In essence the pulse shifter 22 operates more or less as a gate which will produce output pulses in the line 24 only when a pulse supplied to the pulse shifter 22 through the line 18 happens to coincide with a pulse supplied to the pulse shifter 22 from the converter 32. Thus, the pulse shifter 22 only supplies output pulses corresponding to pulses from the phase splitter 16 which are in synchronism with the feedback control pulses. Because of the operation of the pulse shifter 22 in accordance with variations in the rate or frequency of the feedback pulses the pulses in the output of the pulse shifter 22 will be variable. In the preferred embodiment these pulses will be within the range of from 0 to 800 cps.

In the system 10 the output of the pulse shifter 22 as supplied to the line 24 is passed to a frequency comparator 36 as one of two inputs to this frequency comparator. The other input to the frequency comparator 36 is a signal obtained from the phase splitter 16 as hereinafter described. The frequency comparator is in essence a comparison device or means which compares the two outputs of the phase splitter 16 after one of these outputs has been "modified" by the pulse shifter 22 in accordance with a feedback from the motor 12 so as to govern the operation of the motor.

From the preceding it will be realized that with the preferred structure the frequency of the pulses from the splitter 16 in the line 20 will be 8,000 cps., and that pulses at this rapid a rate cannot be directly compared with pulses within the line 24 at a rate of from 0 to 800 cps. In order to place the reference signal from the phase splitter 16 in condition for comparison in the frequency comparator 36 this signal in the line 20 is conveyed to a conventional frequency divider 38. An integrated circuit designated by the number SN 7490 manufactured by the Texas Instrument firm referred to in the preceding may be employed as the divider 38. In the preferred embodiment herein described this frequency divider 38 divides the input signal by a factor of 20 so as to obtain in a line to a reference input signal to the frequency comparator 36 from the phase splitter 16 of pulses at a constant 400 cps.

With the described preferred embodiment this reference input figure of 400 cps. is compared with the frequency of pulses supplied through the line 24. The preferred embodiment of the invention described is constructed so that when the pulses through the line 24 are at the rate of 400 cps. the motor 12 is at rest or it is not being utilized so as to vary a condition which will cause a feedback into the system 10. In the preferred embodiment the frequency comparator 36 will determine if the pulses supplied to the line 24 are at or above or below the reference frequency of the pulses supplied through the line 40 and will provide an output in either of two lines 42 and 44.

Figure 3:
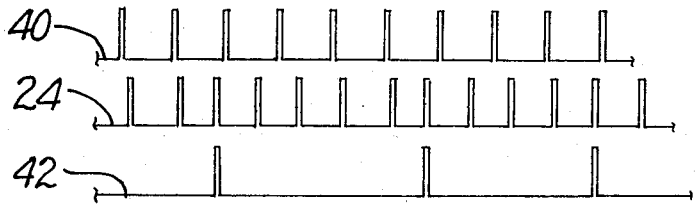
FIGS. 3 and 4 are pulse diagrams indicating the operation of the frequency comparator or comparison means shown in the preceding figure.
Figure 4:
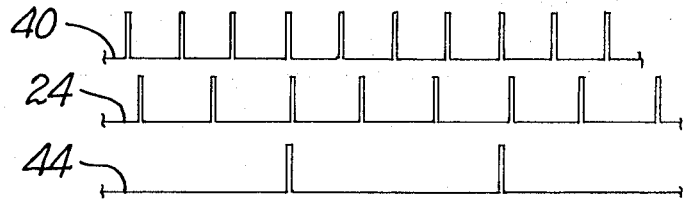

These lines 42 and 44 are connected to a conventional motor control 46 used in connection with the motor 12. When a signal from the comparator 36 is applied to the line 42 this motor 12 will be operated in one direction or manner. When a signal is applied to the motor 12 through the other line 44 it will be operated in another direction or manner. Such differences in the operation of the motor 12 are obtained within the comparator 36 by this comparator 36 in effecting comparing frequencies as indicated in FIGS. 3 and 4 of the drawing. If the reference frequency to the line 40 is less than the frequency through the line 24 an output through the line 42 will be achieved as indicated in FIG. 4. If the frequency through the line 40 is greater than the frequency of the pulses through the line 24 an output through the line 44 will be obtained as shown in FIG. 4. The rate at which the motor 12 will be operated in either of the two methods or modes described will depend upon the rate at which pulses are supplied through the line 24 to the comparator 36. In all cases this comparator 36 will provide an output at either of the lines 42 or 44 which is algebracially correct, and which will correspond to the intended operation of the motor 12.

Figure 2:
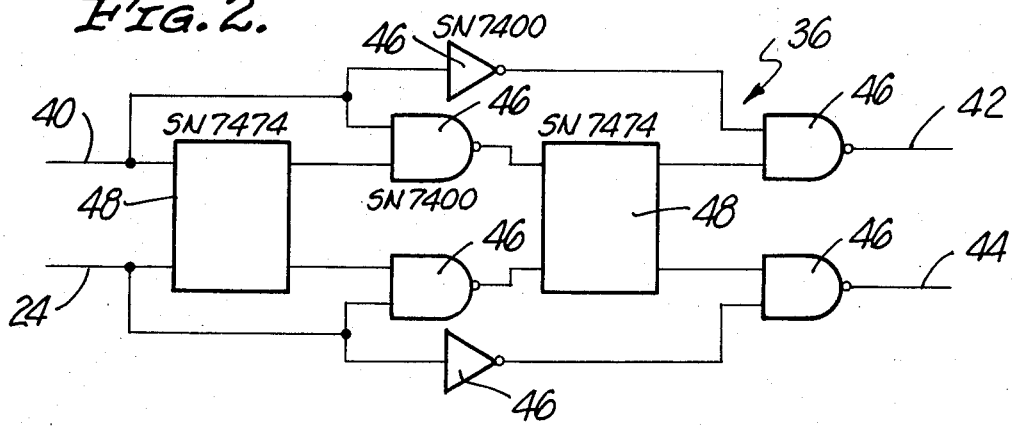
FIG. 2 is a similar view showing the components of a frequency comparator or comparison means as illustrated in the preceding figure.

Inasmuch as structures of suitable frequency comparators 36 for use with the invention are not well-known, the nature of a suitable frequency comparator for use in accordance with this invention is illustrated in FIG. 2 of the drawing. The comparator 36 shown here consists of six integrated circuits 46 designated by the number SN 7400 produced by the aforementioned Texas Instruments firm and two integrated circuits 48 designated by the number SN 7474 by this same firm. These integrated circuits are connected as illustrated. It will be understood that other suitable structures for the comparator 36 may be designed and built through the use or exercise of routine engineering skill.

I claim:

1. A control system in which an electric motor capable of being operated in two ways is operated in order to accomplish a function in which the improvement comprises:

supply means for supplying a reference current having pulses at an initial frequency and splitter means for splitting the current from said reference means into first and second separate currents, each having pulses at related reference frequencies;

control means for supplying a control current having pulses at a control frequency which corresponds to a function to be accomplished by the operation of said motor;

shifter means for producing an output current having pulses at a variable frequency corresponding to when pulses of the first of said separate currents are in synchronism with the pulses of said control current, said shifter means being connected to said supply means and said control means, comparison means for comparing the frequencies of the pulses of said output current and of pulses within said second separate current to determine if the frequency of one is greater than the frequency of the other, said comparison means being connected to said supply means and said shifter means, said comparison means also being operatively connected to said motor to operate said motor in either of said means depending upon which of the frequencies compared by said comparison means is greater.

2. A control system as claimed in claim 1 wherein:

said control means is operatively connected to the output of said motor so as to provide a feedback to control the operation of said motor through said control system.

3. A control system as claimed in claim 2 wherein:

said control means includes voltage transducer means for producing a voltage in accordance with the operation of said motor and analog to frequency converter means connected to said transducer means for converting the output of said transducer means to a series of pulses.

4. A control system as claimed in claim 1 wherein:

said shifter means is a pulse shifter.

5. A control system as claimed in claim 1 wherein:

said comparison means is a frequency comparator.

6. A control system as claimed in claim 1 wherein:

said control means is operatively connected to the output of said motor so as to provide a feedback to control the operation of said motor through said control system, said control means includes voltage transducer means for producing a voltage in accordance with the operation of said motor and analog to frequency converter means connected to said transducer means for converting the output of said transducer means to a series of pulses, said shifter means is a pulse shifter, said control comparison means is a frequency comparator.

* * * * *